Jan. 27, 1959     R. R. GASPER     2,870,542
APPARATUS FOR DETERMINING THE LOCATION OF MOUNTING
HOLES TO BE DRILLED IN A PART
Filed Sept. 8, 1954     6 Sheets-Sheet 1
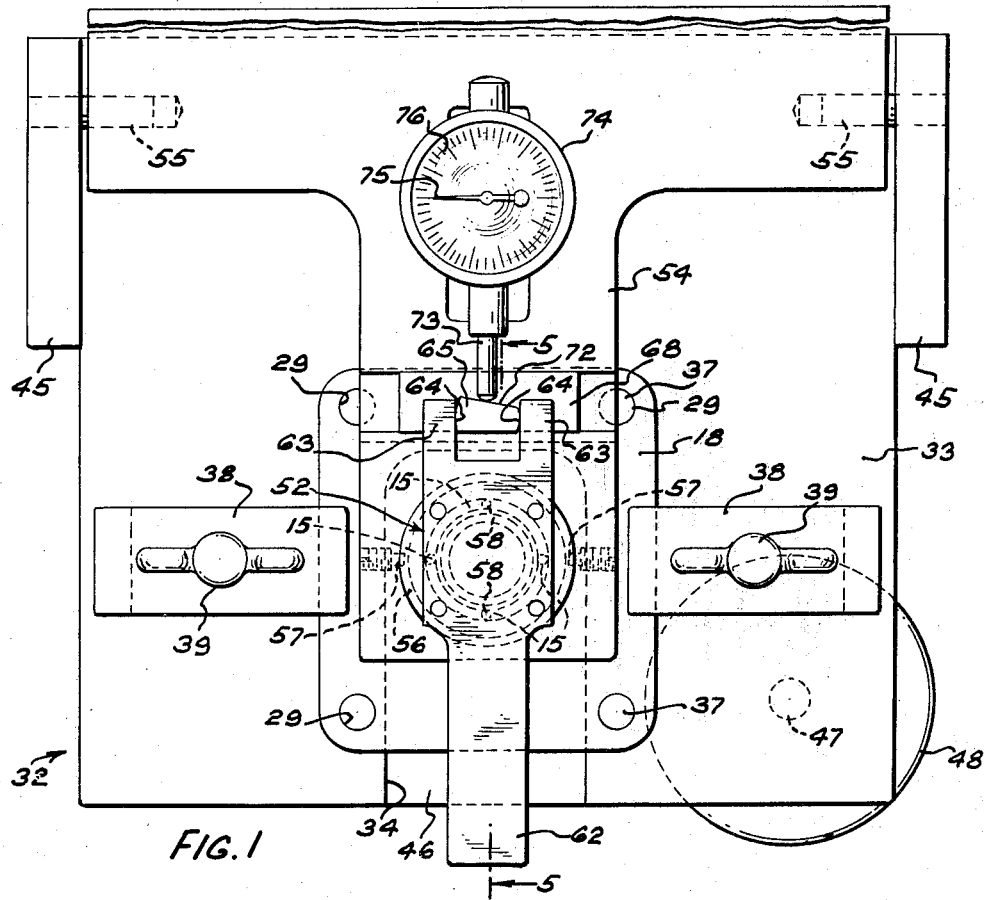
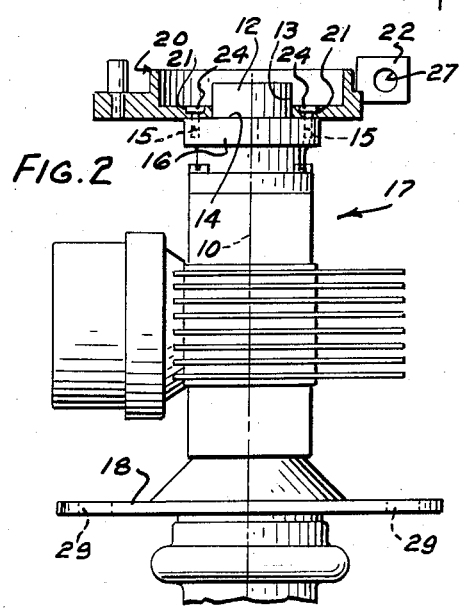
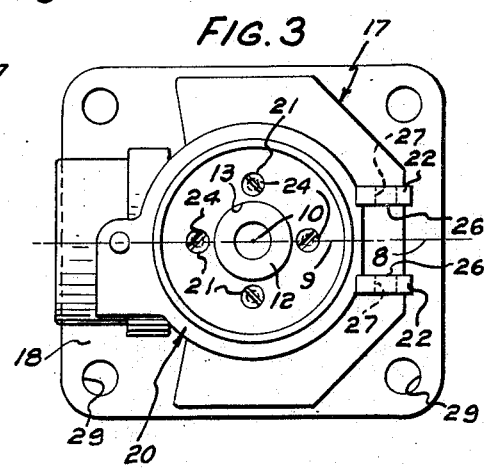
INVENTOR
R. R. GASPER
BY C. B. Hamilton
ATTORNEY

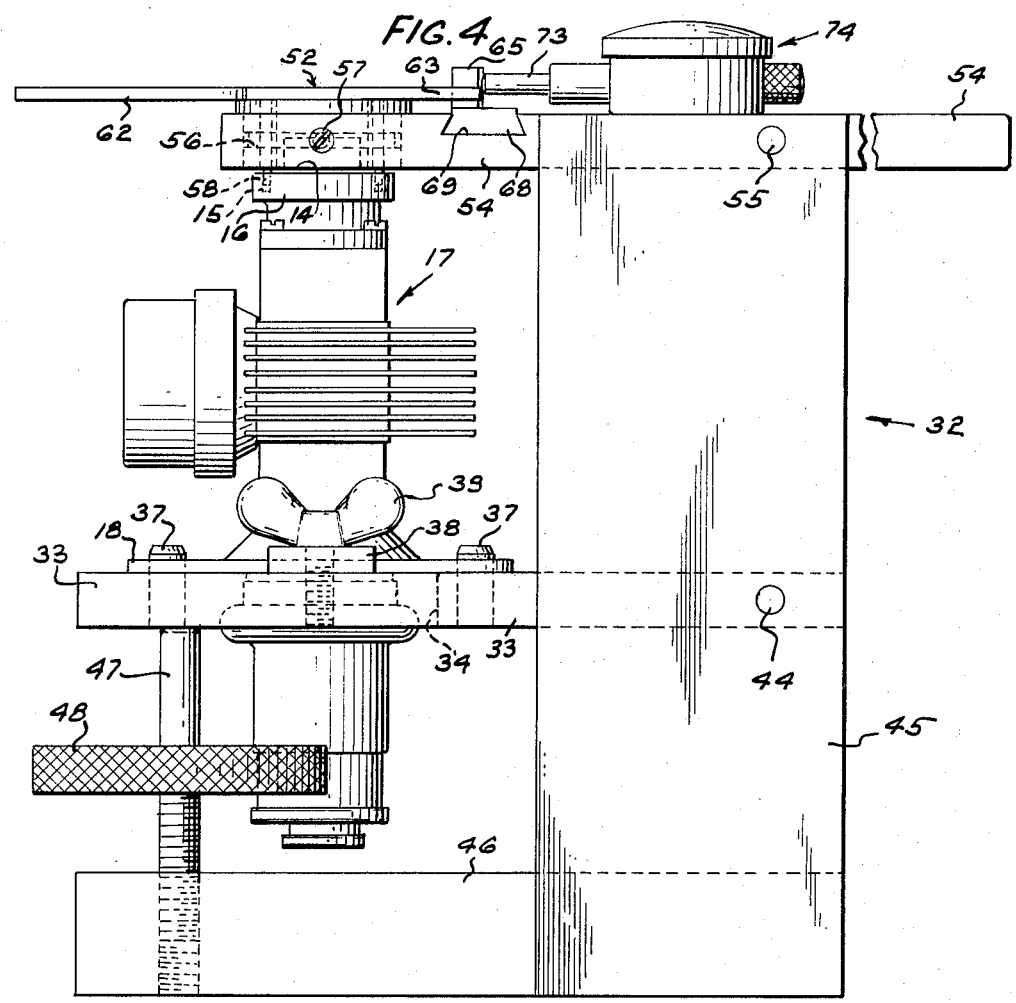
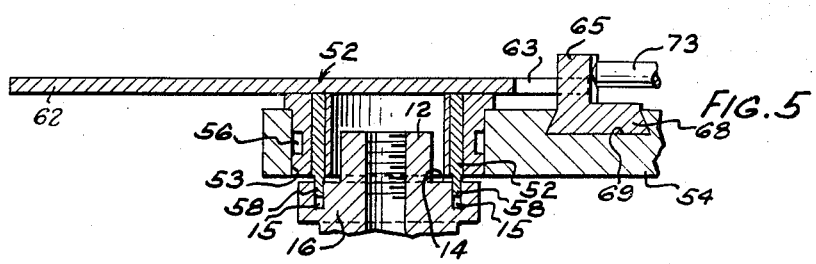
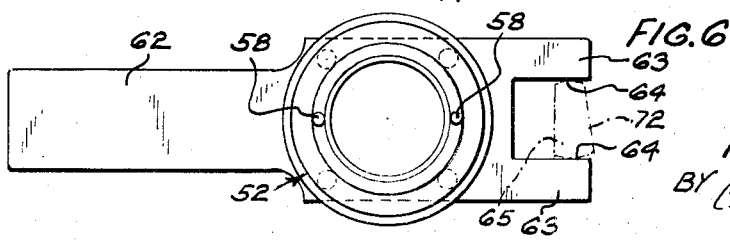

Jan. 27, 1959 R. R. GASPER 2,870,542
APPARATUS FOR DETERMINING THE LOCATION OF MOUNTING
HOLES TO BE DRILLED IN A PART
Filed Sept. 8, 1954 6 Sheets-Sheet 3
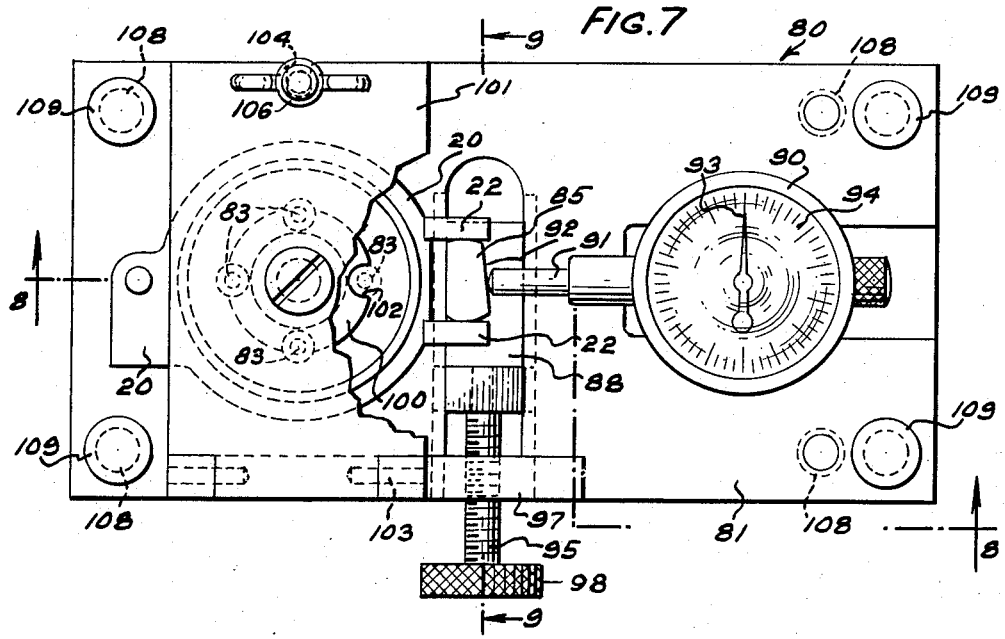
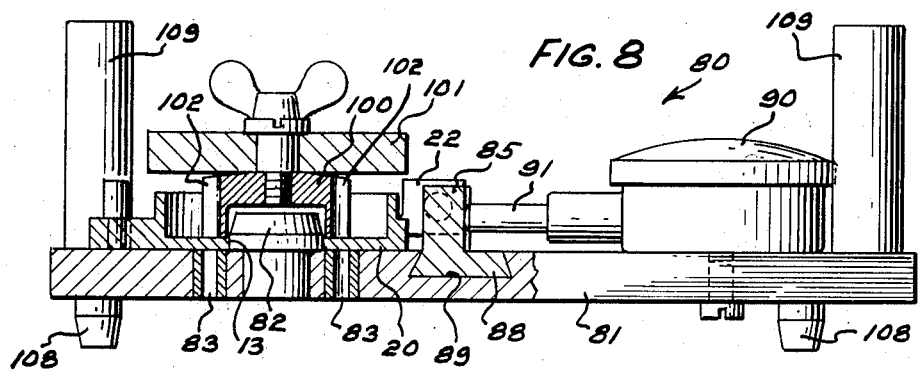
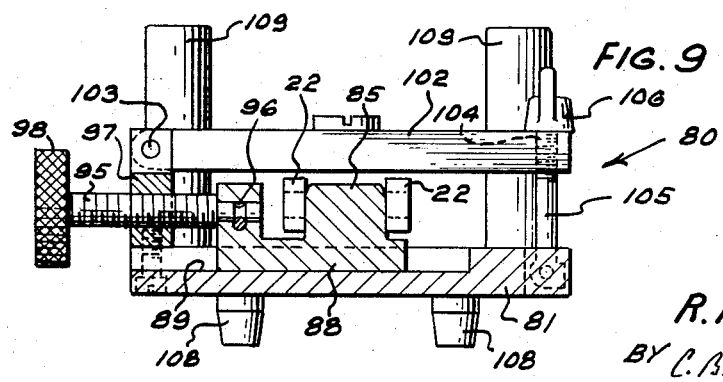
INVENTOR
R. R. GASPER
BY C. B. Hamilton
ATTORNEY Jan. 27, 1959 R. R. GASPER 2,870,542
APPARATUS FOR DETERMINING THE LOCATION OF MOUNTING
HOLES TO BE DRILLED IN A PART
Filed Sept. 8, 1954 6 Sheets-Sheet 4
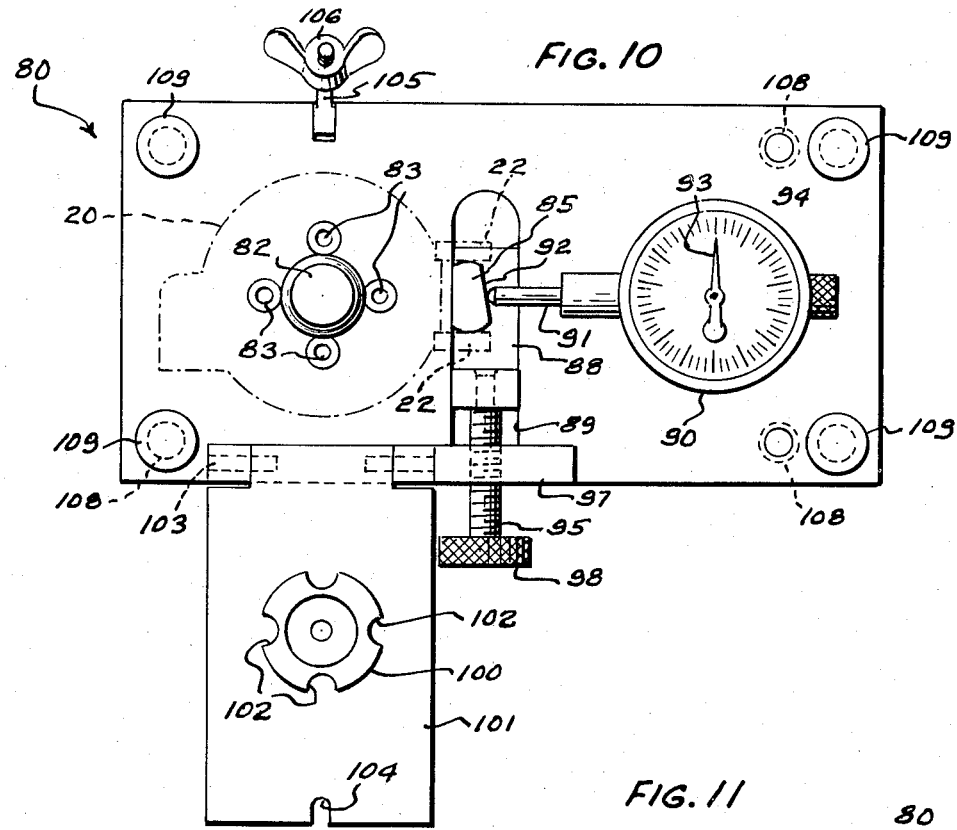
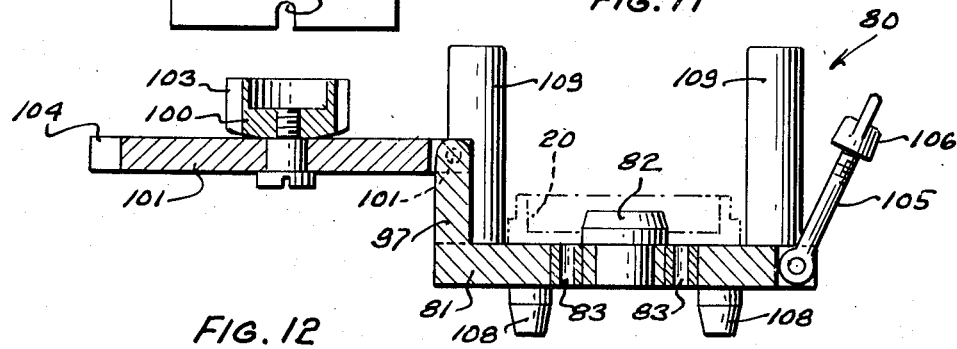
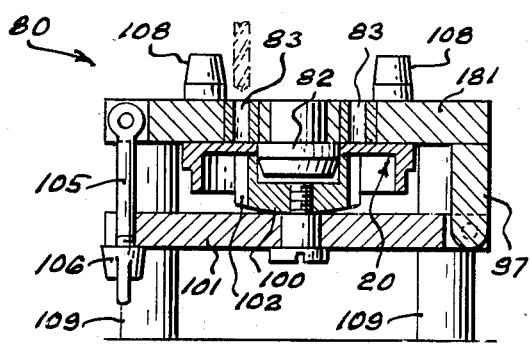
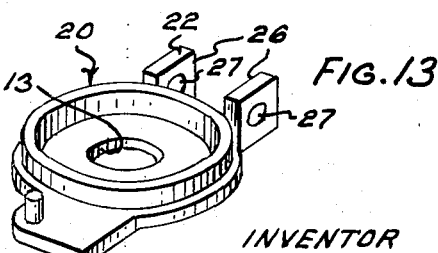
INVENTOR
R. R. GASPER
BY C. B. Hamilton
ATTORNEY

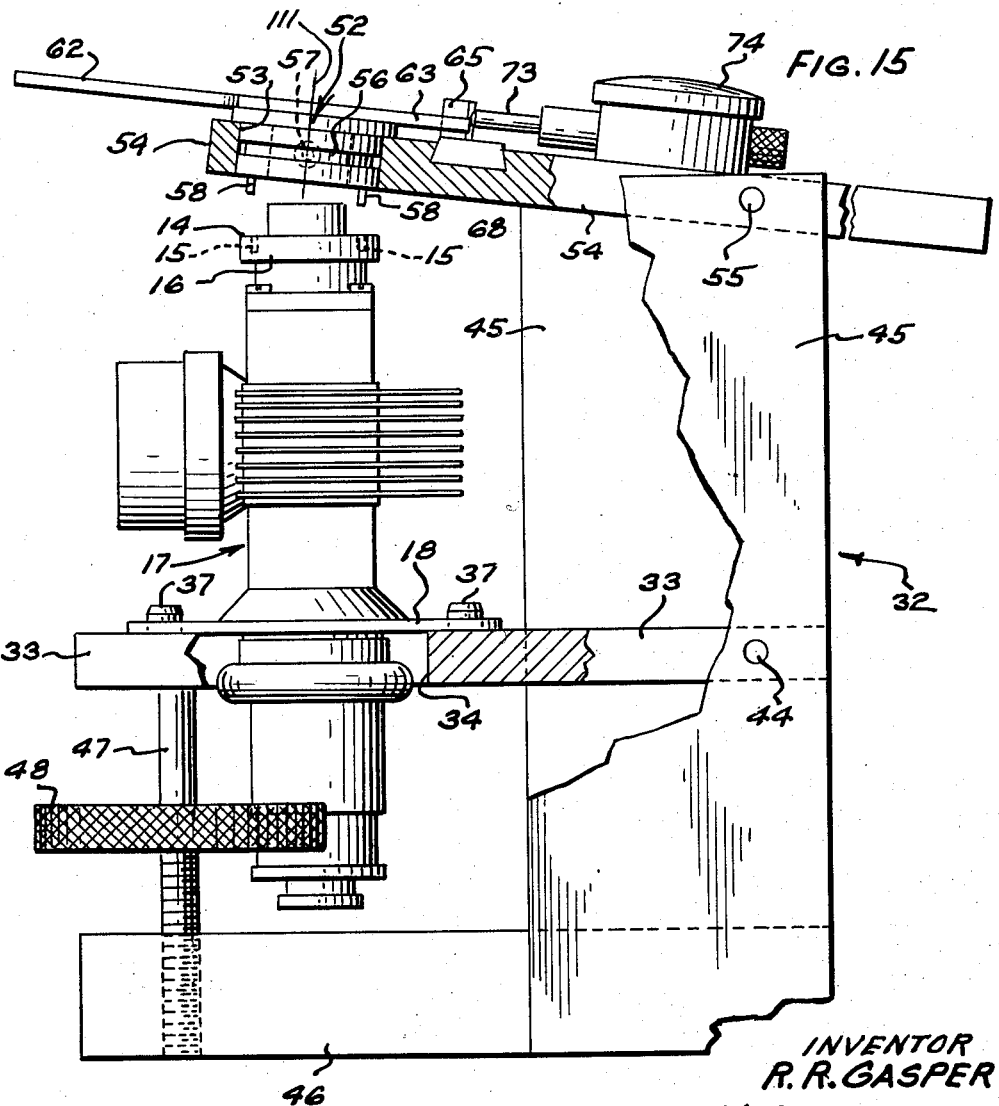

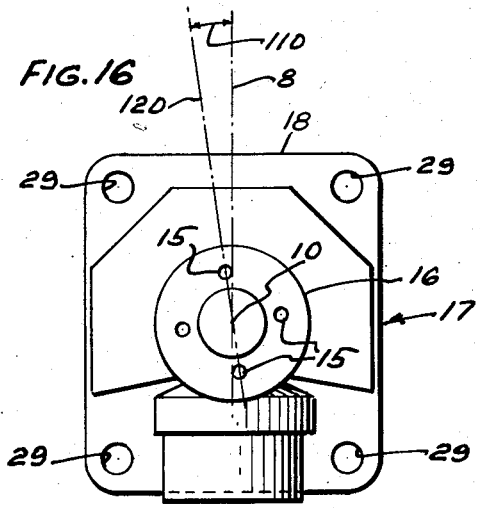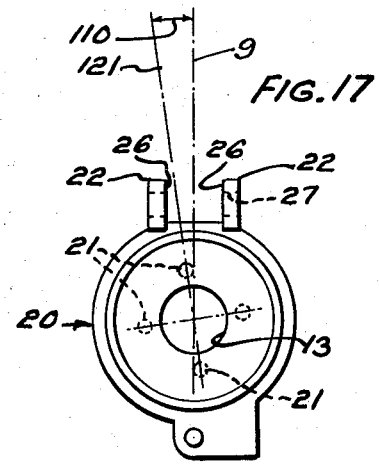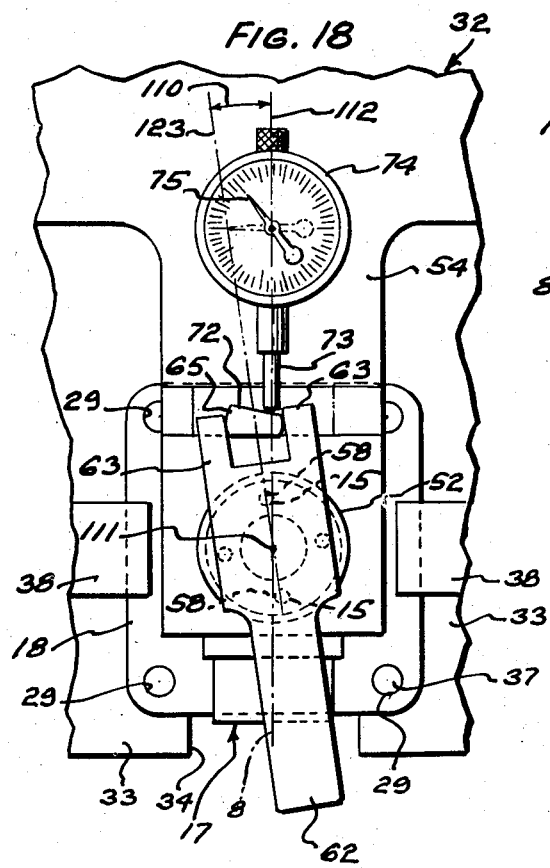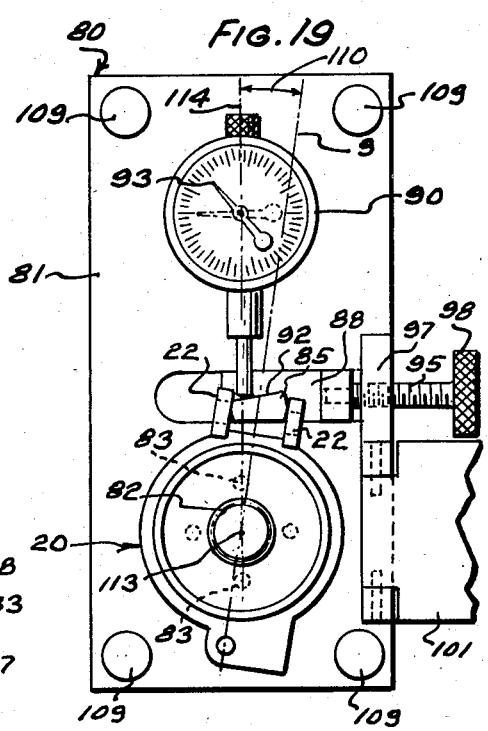

United States Patent Office 2,870,542
Patented Jan. 27, 1959

2,870,542

APPARATUS FOR DETERMINING THE LOCATION OF MOUNTING HOLES TO BE DRILLED IN A PART

Robert R. Gasper, Clarendon Hills, Ill., assignor to Western Electric Company, Incorporated, New York, N. Y., a corporation of New York Application September 8, 1954, Serial No. 454,658

7 Claims. (Cl. 33—181)

This invention relates to an apparatus for determining the location of mounting holes to be drilled in a part and more particularly to a gaging device for supporting an article in a predetermined position and gaging and indicating the relative angular position of mounting holes therein, and to a supplementary drill guide device for supporting and angularly adjusting the part to be mounted on said article and for indicating the position of the part relative to the drill guide apertures whereby the part may be adjusted on the drill guide device to indicate the same angular relation to the drill guide apertures as that of the mounting holes in the article to the gaging device.

An object of the invention is to provide an apparatus for determining the location of mounting holes to be drilled in a part.

Another object of the invention is to provide a device for supporting an article in a predetermined position and having an oscillatable gaging means engageable with holes in the article and having an indicator means for indicating the relative angular position of the gaging means and the holes in the article.

Another object of the invention is to provide a device having a plurality of drill guide apertures arranged according to the mounting holes in said article for supporting for oscillatable movement the part to be mounted on said article and having means for oscillating the part and for indicating the relative angular position of the part and for clamping the part thereto to permit the holes to be drilled in the part.

An apparatus illustrating certain features of the invention may include a gaging or locating device for supporting a magnetron on which an apertured part is to be secured by screws passing into threaded holes in the magnetron and through holes in the part, the locations of which are to be determined and drilled in the part. The exact positions of these threaded holes vary in different magnetrons. A gage having a pair of arms simulating a pair of arms of the part to be drilled is oscillatably mounted on a supporting plate of the gaging device and is movable with the supporting plate into engagement with the magnetron where the gage is oscillated until a pair of gage pins thereon are aligned with and enter a pair of the threaded holes in the magnetron. A slide movable with the gage then actuates a dial indicator to indicate the precise position of the gage on the supporting plate relative to the magnetron. The apparatus also includes an adjustable drill jig for locating the position of the holes to be drilled in the part as previously determined by the dial indicator with the gage. This drill jig also has a plate for supporting the apertured part for oscillatable movement relative to a plurality of drill apertures in the plate arranged in the same pattern as that of the threaded holes in the magnetron, and the drill jig is provided with a dial indicator and a slide identical to those of the gaging device. The slide of the drill jig engages the part which is oscillated on the plate to a position corresponding to that of the gage member on the supporting plate of the gaging device, whereby the dial indicator then shows the same reading as that of the dial indicator on the gaging device. The part is then clamped to the drill jig and holes are drilled in predetermined desired positions therein so that when the part is secured to the magnetron by screws passing through drilled holes in the part and threaded holes in the magnetron, the part will be assembled in the proper predetermined aligned relation thereto.

Other objects and advantages of the invention will become apparent by reference to the following detailed description thereof and the accompanying drawings illustrating a preferred embodiment of the invention, in which—

Fig. 1 is a plan view of the gaging device for determining the relative angular position of the mounting holes in an article;

Fig. 2 is a side elevational view of the article and showing a part in cross section mounted thereon;

Fig. 3 is a plan view of the article with the part mounted thereon;

Fig. 4 is a side elevational view of the device shown in Fig. 1;

Fig. 5 is an enlarged fragmentary vertical sectional view of the device taken on line 5—5 of Fig. 1 and showing a gage oscillatably mounted in a supporting plate and having a pair of gage pins seated in a pair of mounting holes in the article;

Fig. 6 is a bottom view of the gage shown in Fig. 5;

Fig. 7 is a plan view of the drill jig showing a part clamped thereon into which holes are to be drilled;

Fig. 8 is a longitudinal sectional view of the drill jig with a part thereon into which holes are to be drilled taken on the line 8—8 of Fig. 7;

Fig. 9 is a vertical cross-sectional view of the drill jig taken along the line 9—9 of Fig. 7;

Fig. 10 is a plan view of the drill jig with a clamping plate thereof in opened position and showing in dotted lines on the drill jig the part into which holes are to be drilled;

Fig. 11 is a vertical cross sectional view of the drill jig taken along line 11—11 of Fig. 10 and showing in dotted lines the part into which holes are to be drilled;

Fig. 12 is a vertical cross sectional view of the drill jig showing it in inverted position with the part clamped therein in position to have holes drilled therethrough;

Fig. 13 is a perspective view of the part into which holes are to be drilled in the drill jig;

Fig. 14 is an enlarged perspective view of the gage of the gaging device;

Fig. 15 is a side elevational sectional view of the gaging device showing an article mounted in a predetermined position thereon and showing the gage of the device disposed in an intermediate position above and in close proximity to the upper end of the article;

Fig. 16 is a plan view of the article indicating the relation of predetermined mounting holes in the end thereof to the centerline of the article;

Fig. 17 is a plan view of the part which is to be secured to the upper end of the article shown in Fig. 16 and into which part, holes are to be drilled in a predetermined relation to the centerline thereof;

Fig. 18 is a fragmentary plan view of the gaging device in operative gaging relation to the article mounted thereon; and Fig. 19 is a plan view of the drill jig with the part thereon adjusted to a predetermined drilling position.

Referring to Figs. 2, 3, 15 and 16 of the drawings, there is shown an article 17 which is a partially completed magnetron provided with a mounting plate or base component 18 in which four mounting holes 29 are drilled in predetermined positions and by means of which the magnetron is secured in a predetermined position on a support in a predetermined relation to other mechanism associated therewith. The magnetron 17 is a composite structure made from preformed components bonded one to another along an axis 10 thereof, and the upper component 16 has a shoulder 14 provided with four threaded holes 15 therein arranged in a predetermined pattern around the axis 10. A magnetron component or part 20 (Figs. 2, 3, 13, 17, and 19) is secured to the shoulder of the magnetron 17 by four screws 24 which pass through holes 21 in the part 20 and engage the threaded holes 15 in the shoulder 14 of the magnetron. The part 20 has a flat substantially circular bottom wall with a central aperture 13 to receive the reduced cylindrical end 12 of the upper component 16 and the part 20 has a pair of laterally directed arms 22 with inner faces 26 disposed in spaced and parallel relation to each other. The arms have apertures 27 for rotatably supporting a shaft (not shown). As a result of bonding these pre-formed components together, slight variations occur in different magnetrons 17 in the position of the holes 15 in the shoulder 14 relative to the mounting plate 18. It is essential in the fabrication of the magnetron 17 that the part 20 be secured to the magnetron 17 with the arms 22 of the part 20 in a predetermined position relative to the mounting plate 18 so that a centerline 9 of the part 20 (Fig. 3) be aligned with a centerline 8 of the mounting plate 18. Two of the holes 15 of the magnetron 17 are disposed substantially along the centerline 8 of the mounting plate 18 as viewed from above. However, since the angular position of the holes 15 about the axis 10 varies with respect to centerline 8 of the mounting plate 18 in different magnetrons, the holes 21 of the parts 20 cannot be drilled in the same uniform position in all of the parts 20. Thus, the position of the holes 15 relative to the centerline 8 of the mounting plate 18 has to be determined for each magnetron individually, and a part 20 for each magnetron has to have the holes 21 drilled therein in the same relation to the centerline 9 thereof as that of the holes 15 to the centerline 8 of the mounting plate 18 of the magnetron to which it is to be assembled to insure that the part 20 when assembled to the magnetron will have the arms 22 thereof in the required predetermined relation to the mounting plate 18 on the magnetron.

An article 17 (Fig. 16) is shown as having the tapped mounting holes 15 in the upper end portion thereof angularly offset about the axis 10 an exaggerated amount relative to the centerline 8 of the mounting plate 18. The angular position of the holes 15 is indicated by the angle 110 between the centerline 8 and a centerline 120 passing through a pair of the holes 15. The part 20 (Fig. 17) in which holes 21 are to be drilled, has to have these holes 21 drilled therein about the axis of the opening 13 in the same angular relation to the centerline 9 of the part 20 that obtains between the holes 15 and the centerline 8 of the article 17 so that when the part 20 is secured to the article 17 by the screws 24, the arms 22 of the part 20 and the centerline 9 thereof will be in predetermined alignment relative to the centerline 8 of the mounting plate 18. Thus two of the holes 21 will be drilled in the part 20 on a centerline 121 which passes through the axis of the opening 13 and is angularly offset from the centerline 9 of the part 20 by the angle 110.

The present apparatus is designed to facilitate the assembling of the parts 20 to the magnetrons or articles 17 in a predetermined relation to the mounting plates 18 thereon and comprises a gaging or locating device 32 and an adjustable drill jig 80. The gaging device 32 is used for locating and indicating the position of the holes 15 in an article 17 relative to the mounting plate 18 thereof, and the adjustable drill jig 80 is used for supporting a part 20 thereon and adjusting the position of the part 20 relative to drill apertures therein in accordance with the information obtained from the gaging device 32 so that the holes 21 can be drilled in the part 20 in a predetermined relation to the centerline 9 thereof, whereby the part 20 may be secured to the article 17 in aligned relation to the mounting plate 18 thereof.

The article 17 is adapted to be placed in the locating or gaging device 32 with the mounting plate 18 of the article resting on a platform 33 of the gaging device which platform has a slot 34 (Fig. 1) for receiving the lower portion of the article. The platform has a pair of aligning pins 37 engageable in a pair of the holes 29 in the mounting plate 18 for positioning the article 17 in a predetermined position on the platform. A pair of clamping plates 38 on the platform 33 are engageable with the mounting plate 18 and are clamped thereagainst by a pair of thumb screws 39 for securing the article 17 on the platform. A pair of trunnions 44 on the platform 33 are journalled in a pair of vertical frame plates 45 for supporting the platform for pivotal movement and the plates 45 are secured at their lower ends to a base 46. The base 46 and the vertical frame plates 45 form a frame for supporting the platform 33 and other components of the gaging device. At its forward end, the platform 33 is supported on an upright rod 47, the lower end of which is threaded into a threaded aperture in the base 46 and which has a hand wheel 48 thereon for turning the rod 47 to adjustably tilt the platform 33 and the article 17 thereon to coaxially align the upper end 12 of the article with a hollow cylindrical portion of a gage 52 (Figs. 4 and 5).

The gage 52 Figs. 1, 4, 5, 14, 15 and 18 is mounted in an aperture 53 (Fig. 5) in a T-shaped supporting plate 54, as viewed from above, for oscillation about an axis 111 (Figs. 15 and 18). The plate 54 has a pair of trunnions 55 journalled in apertures in the upper ends of the frame plates 45 for supporting the plate 54 for swinging movement to and from an operative position with the gage 52 in engagement with the article 17 and with the axis 111 of the gage aligned with the axis 10 of the article. Clearance is provided between the vertical frame plates 45 and the supporting plate 54 to permit limited lateral movement of this plate. The gage 52 has a peripheral groove 56 engageable by a pair of studs 57 in the plate 54 for retaining the gage against axial displacement relative to the plate, and the gage 52 has a pair of depending diametrically opposed gage pins 58 engageable in a pair of the mounting holes 15 in the article 17. A handle 62 is secured to the gage 52 and has a pair of arms 63, corresponding to the arms 22 of the part 20, extending from one end thereof, which arms have opposed parallel surfaces 64 spaced apart a distance equal to that of the opposed parallel surfaces 26 of part 20. The arms 63 straddle a head 65 with the parallel surfaces 64 engaging a pair of opposed arcuate surfaces on the ends of the head. The head 65 is integral with and extends upwardly from a slide 68 mounted in a slideway 69 (Fig. 5) in the plate 54 for movement in a straight path transversely thereof. The head 65 has a straight cam surface 72 disposed obliquely to the path of travel of the slide and which is engageable by a plunger or actuating member 73 of a dial indicator 74 mounted on the plate 54 along a longitudinal centerline 112 passing through the axis 111 (Fig. 18). The dial indicator 74 has a pointer 75 and a scale or graduations 76 for indicating the position of the gage 52 on the supporting plate 54.

In order to obtain a reading indicating the angular position of the mounting holes 15 in the upper end of the article 17 relative to the mounting plate 18, the article 17 is secured to the platform 33 as described, the swingable plate 54 is lowered to bring the gaging pins 58 into engagement with the upper surface of the shoulder 14 of the article 17, and the handle 62 of the gage member 52 is oscillated to align the gage pins 58 thereon with a pair of mounting holes 15 and permit the movement of the gage pins thereinto. As the gage member 52 is oscillated to align the gage pins 58 with the mounting holes 15, the head 65 is moved thereby and actuates the dial indicator 74, the reading of which will indicate the position of the gage 52 and the gage pins 58 with respect to the supporting plate 54.

A drill jig 80 (Figs. 7–9) is provided for supporting the part 20 and this device has adjustable means engageable with the arms 22 of the part for angularly adjusting the part and it has a dial indicator similar to the dial indicator of the gaging device 32 whereby the part 20 may be angularly adjusted to a position where the pointer of the indicator on the drill jig 80 shows a reading corresponding to that of the dial indicator of the gaging device 32. The drill jig 80 comprises a plate 81 for receiving the part 20 thereon and it has a circular positioning member 82 engageable in the aperture of the part 20 for centralizing the part and guiding it for angular adjustment about the axis 113 of the member 82. A plurality of drill guide bushings are inset in the plate 81 to provide drill guide apertures 83 arranged in a pattern corresponding to the mounting holes 15 in the upper end of the article 17 and disposed in a predetermined position about the circular member 82. The arms 22 of a part 20 applied to the drill jig 80 straddle a head 85 similar to the head 65 of the gaging device 32 with the parallel surfaces 26 of the arms in engagement with the arcuate end surfaces of the head 85. The head 85 extends upwardly from a slide 88 mounted in a slideway 89 in the plate 81 for movement in a straight path transversely of the plate. A dial indicator 90 (similar to the dial indicator 74 of the gaging fixture) is mounted on the plate 81 and has a plunger or actuating member 91 engageable with an obliquely disposed cam surface 92 on the head 85 for actuating the pointer 93 of the dial indicator, the relative position of which may be read on a scale 94 of the indicator.

The slide 88 is actuated by a screw 95 rotatably secured to the slide at 96 and threadably supported in a block 97 secured to the plate 81. The screw 95 has a knurled knob 98 for turning it to effect the movement of the slide and the angular adjustment of the part 20. From an inspection of Figs. 16–19, it will be seen that the mounting holes 15 in the article 17 are angularly offset about the axis 10 a predetermined angle 110 in a counter-clockwise direction from the centerline 8 of the mounting plate of the article, and that it is necessary to adjust the part 20 on the drill jig 80 in a clockwise direction through a similar angle 110 as shown in Fig. 19 to properly position the part 20 relative to the drill apertures 83 in the drill jig 80. The slope of the oblique cam surface 92 on the head 85 is reversed relative to the slope 72 on the head 65 to permit equal and opposite movement of the head 65 and 85 of the gaging device 32 and the drill jig 80, respectively, while the pointers 75 and 93 of the dial indicator 74 and 90 turn in the same direction to indicate such movements of the heads 65 and 85 from predetermined reference points. After the part 20 has been angularly adjusted to a position wherein the pointer 93 of the dial indicator 90 has the same setting or reading as the pointer 75 of the dial indicator 74 of the gaging device 32, the part 20 is clamped to the plate 81 by a cup-shaped member 100 which is carried by a clamping plate 101 and has clearance notches 102 aligned with the drill guide apertures 83 in the plate 81. The clamping plate is hinged at one end 103 to the block 97 and has a slot 104 at its other end for receiving a bolt 105, which is pivoted to the plate 81 and has a clamping nut 106 thereon for moving the plate 101 and member 100 into clamping engagement with the part 20. A plurality of studs 108 on the underside of the plate serve as feet for supporting the device 80 while the part 20 is being adjusted and clamped thereto and a plurality of posts 109 fixed to the upper side of the plate 81 serve to support the drill guide device in inverted position whereby the device may be placed in a drill press and the mounting holes 21 drilled into the part 20 in a predetermined pattern corresponding to that of the holes 15 in the article 17.

It is to be understood that there is a predetermined correlation between the dial indicator 74, the head 65, the slide 68, and the oscillatable gage 52 with its pair of arms 63 on the supporting plate 54 of the gaging device 32, and the dial indicator 90, the head 85, the slide 88, and the part 20 with its pair of arms 22 when the part 20 is on the plate 81 of the drill jig 80. This correlation of the components of the gaging device 32 and the drill jig 80 is best shown in Figs. 18 and 19 where the gaging device and the drill jig are shown in plan view in side by side relation to each other. The gaging device 32 in Fig. 18 is shown supporting the article 17 depicted in Fig. 16, and with the supporting plate 54 lowered and the gage 52 resting on the upper end of the article 17 in coaxial alignment therewith and with the pair of gage pins 58 seated in a pair of the mounting holes 15 in the upper end of the article 17. With the gage 52 in this position the arms 63 thereon, which simulate the arms 22 of the part 20, have moved the head 52 to the position shown and the oblique cam surface 72 thereon has actuated the dial indicator 74 to indicate the lateral position of the head 65 and the precise angular position of the gage pins 58 relative to a longitudinal centerline 112 of the gage supporting plate 54 (Fig. 18) and relative to the centerline 8 of the mounting flange 18 of the article 17. The dial indicator 74 thus indicates the angle which is formed by the centerline 112 and a centerline 123 (Fig. 18) passing through the gage pins 58 and which angle is the same as the angle 110 between the centerlines 8 and 120 indicated in Fig. 16.

In the drill jig 80 (Fig. 19) the part 20 is supported on the plate 81 for oscillatable movement about the axis 113 of the member 82 which corresponds to the axis of oscillation 111 of the gage 52 on the gaging device 32. The head 85 of the drill jig is mounted on the plate 81 a predetermined distance from the axis 113 corresponding to the distance of the head 65 from the axis 111 on the gaging device 32 but the slope of the oblique cam surface 92 on the head 85 is reversed with respect to the slope of the oblique cam surface 72 on the head 65. The dial indicator 90 is similar to the dial indicator 74 and is mounted on the plate 81 of the drill jig 80 along the longitudinal centerline 114 thereof in the same relation to the head 85 and the axis 113 as that of the indicator 74 on the plate 54 to the head 65 and the axis 111. The drill apertures 83 are located in the plate 81 with two of them on the centerline 114. The dial indicators 74 and 90 are set with the pointers at zero when the heads 65 and 85 are in center positions with the rounded ends thereof equidistant from centerlines 112 and 114 respectively, and with the arms 63 of the gage 52 and the arms 22 of a part 20 on the drill jig 80 disposed parallel to the centerlines 112 and 114 respectively.

It will be apparent by inspection of Figs. 16, 17 and 18 that in order to drill holes 21 in the part 20 which are to be shifted in a counter-clockwise direction relative to the centerline 9 of the part 20 (Fig. 17) the part 20 has to be adjusted or turned in the opposite or clockwise direction on the drill jig 80 about the axis 113 and through an angle 110 relative to the centerline 114 and the drill guide apertures 83 of the drill jig (Fig. 19). The arrangement of the components of the gaging device 32 and of the drill jig 80, and the directions of the slopes of the cam surfaces 72 and 92 of the heads 65 and 85, respectively, are such as to provide for movement of the heads 65 and 85 through corresponding distances in opposite directions relative to each other while the pointers 75 and 93 of the dial indicators 74 and 90, respectively, rotate through corresponding angular distances in the same direction relative to each other.

*Operation*

When a part 20 is to be assembled onto an article 17, the position of the holes 15 in the article 17 is first determined with the aid of the gaging device 32. The supporting plate 54 of the gaging device 32 is swung to a vertical position and the article 17 is placed on the platform 33 with the aligning pins 37 on the platform engaging the holes 29 in the mounting plate 18 and the article 17 is then clamped to the platform by the clamps 38 to support the article 17 in a predetermined position thereon. The supporting plate 54 is then swung downwardly to lower the gage pins 58 into engagement with the upper surface of the shoulder 14 of the article 17, after which the handle 62 is manipulated to oscillate the gage 52 and align the gage pins 58 with the holes 15 in the article 17 and move them into the holes as shown in Fig. 4. The engagement of the gage pins 58 in the holes 15 of the article 17 determines the position of the gage 52 and the pair of arms 63 thereon on the supporting plate 54, which in turn determines the position of the head 65 and the slide 68 on the plate 54 and this position of the head 65 and gage 52 is indicated by the reading of the dial indicator 74.

A part 20 which is to be assembled to the article 17 in the gaging device is placed on the plate 81 of the drill jig 80 (Figs. 7–9) with the positioning member 82 fitting in the aperture 13 (Fig. 8) of the part 20 and with the pair of arms 22 of the part 20 in engagement with opposite sides of the head 85 on the slide 88. The knob 98 of the screw 95 is then turned to adjust the part 20 about the axis of the member 82 until the dial indicator 90 shows a reading identical to that of the dial indicator 74 of the gaging device 32. The part 20 is thus adjusted to its proper position relative to the drill apertures 83 and the part 20 is then clamped to the plate 81 by the clamping plate 101, and the drill guide device 80 is then inverted and the holes 21 are drilled in the part. The position of the holes 21 in the part 20 will be such that when the part 20 is assembled to the article 17 and secured thereto by screws 24 engaging the holes 15, 21 and the pair of arms 22 of the part 20 will be properly positioned relative to the mounting plate 18.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In an apparatus for locating mounting holes to be drilled in an apertured part having a laterally disposed pair of lugs with a pair of opposed parallel surfaces, a plate having a circular member engageable in the aperture of said part for supporting said part for oscillatable movement about an axis through the member, a slide mounted on said plate for movement along a predetermined path and having a head provided with a pair of curved surfaces engageable with said parallel surfaces of the part and provided with a cam surface disposed obliquely with respect to said path of travel, a dial indicator mounted on said supporting plate and having a movable element engageable with said cam surface for actuating said dial indicator in response to movement of said slide to indicate the positions of said part and said head on the plate, means for moving said slide, means for clamping said part to said plate after it has been adjusted about said axis, guides in said plate for guiding drills to predetermined locations on said part, and means on said plate for supporting it in inverted position with the part and the dial on the underside thereof.

2. In an apparatus for determining the position of mounting holes in an article, the combination of a gage oscillatable about a predetermined axis and having a laterally disposed portion with a slot disposed radially of the axis and having a pair of pins disposed parallel to said axis engageable in the mounting holes of said article, a plate for supporting said gage for oscillation about said axis, a slide mounted on said plate for movement along a predetermined path and having a head engageable with said gage in the slot thereof, an actuating lever fixed to said gage for oscillating it and moving said head, a dial indicator mounted on said supporting plate and actuable by said head to indicate the angular position of said gage and the holes in said article relative to the plate, means for supporting said article in a predetermined fixed position and for supporting said plate for movement to and from an operative position with the gage in engagement with said part whereby said lever may be actuated to oscillate the gage to align the pins with and move them into the mounting holes of said article.

3. In an apparatus for determining the position of holes in an end component of a composite article relative to a base component of the article, the combination of a frame having means for receiving the base component in a predetermined position and for supporting said article upright with the holes in the end component arranged about a predetermined vertical axis, a gage having a pair of parallel gage pins projecting therefrom engageable in a pair of the holes in the end component of the article and having a laterally extending portion with a slot therein, a plate for supporting said gage for oscillation about a second axis parallel to the gage pins, means on said frame for mounting said plate above the article for movement to an operative position with the gage in engagement with the end component of the article and with said second axis disposed in coaxial relation with said vertical axis, a slide mounted on said plate for movement along a predetermined path and having a head engageable with the laterally disposed portion of said article in the slot therein for movement thereby, a cam surface on said head disposed obliquely with respect to said path of travel, a dial indicator mounted on said supporting plate in engagement with the cam surface of said head for actuation thereby to indicate the position of the head and of the gage on the plate and the position of the gage pins and the said pair of holes in the end component of the article relative to the base component, and means for moving said gage to engage the pins thereof with the holes in the end component of the article.

4. In a device for indicating the position of holes in an end component of a composite article relative to a base component of the article, a frame having a platform engageable with the base component for supporting the article with said end thereof directed upwardly, means on the platform for securing the base component in a predetermined position thereon, a plate, a gage oscillatably mounted on said plate and having a pair of gage pins engageable in a pair of the holes in the end component of the article, means on the frame for mounting the plate for movement through a predetermined path to guide the gage and the gage pins into engagement with the end component of the article, a pair of arms extending from said gage in a predetermined spaced and parallel relation to each other and parallel to said plate, a cam member disposed between and in engagement with said arms for movement thereby and slidably mounted on the plate for movement along a predetermined path transversely of said arms, a handle for oscillating the gage on said plate to effect the aligning of the gage pins with holes in the end component of the article and the movement of the pins thereinto and simultaneously with the oscillating of the gage for imparting movement to said cam member along said path, and a dial indicator mounted on the plate and actuated by the cam member to indicate the position of the cam member and the gage on the plate and the position of the gage pins and the said pair of holes in the end component of the article relative to the base component.

5. In a device for indicating the position of holes in an end component of a composite article relative to a base component of the article, a frame having a platform engageable with the base component of the article for supporting the article in a predetermined position with the end component directed upwardly, a plate, a gage mounted on said plate for oscillatable movement about an axis perpendicular to the plate and having a pair of gage pins parallel to said axis engageable in a pair of the holes in said end component of the article, means pivotally mounting the plate on the frame for movement through a predetermined path to guide the gage and the gage pins into engagement with said end component of the article, a pair of arms extending from said gage in a predetermined spaced and parallel relation to each other and parallel to said plate, a cam member disposed between and in engagement with said arms for movement thereby and slidably mounted on the plate for movement along a predetermined path transversely of said arms, a handle for oscillating the gage on the plate and for pivotally moving the plate to effect the aligning of the gage pins with the holes in the end component of the article and the movement of the pins thereinto and simultaneously with the oscillating of the gage for imparting movement to said cam member, said cam member having a flat cam face disposed in diverging relation to the path of movement of said cam member, and a dial indicator mounted on the plate and having an actuating plunger disposed perpendicular to the path of movement of the cam member and in engagement with the cam face for actuation by the cam member to indicate the position of the cam member and the gage on the plate and the position of the gage pins and the said pair of holes in the end component of the article relative to the base component.

6. A device for locating a part in a predetermined position thereon and for guiding grills relative thereto wherein the part has a cylindrical opening and a pair of laterally disposed parallel arms which comprises a plate for supporting the part, a cam member slidably mounted on the plate along a predetermined path for receiving the arms of said part on opposite sides thereof and in engagement therewith, means on the plate engageable in the cylindrical opening in the part for guiding the part for oscillatable movement about a predetermined axis, said plate having a plurality of drill guide apertures disposed in predetermined positions about said axis, means for adjusting the position of the cam member along the said path, said cam member having a flat cam face disposed in diverging relation to the path of movement of said cam member, a dial indicator mounted on the plate and having an actuating plunger disposed perpendicular to the path of movement of the cam member and in engagement with the cam face for actuation by the cam member to indicate the position of the cam member and the angular position of the part on the plate, and means for clamping the part of the plate in adjusted position.

7. In a device for locating a part in a predetermined position thereon and for guiding drills relative thereto wherein the part has a cylindrical opening and a pair of laterally disposed parallel arms, the combination of a plate for supporting the part on one side thereof, a cam member slidably mounted on the plate along a predetermined path for reciving the arms of said part on opposite sides thereof and in engagement therewith, means on the plate engageable in the cylindrical opening in the part for guiding the part for oscillatable movement about a predetermined axis, said plate having a plurality of drill guide apertures disposed in predetermined positions about the said axis, means for adjusting the position of the cam member along the said path, a dial indicator mounted on the plate and actuated by the cam member to indicate the position of the cam member and the angular position of the part on the plate, means for clamping the part to the plate in adjusted position, and means on said one side of the plate for supporting the plate in inverted position while the holes are being drilled into the part.

References Cited in the file of this patent
UNITED STATES PATENTS

| | | |
|---|---|---|
| 1,330,225 | Winkelman | Feb. 10, 1920 |
| 1,886,300 | Oslund | Nov. 1, 1932 |
| 2,089,795 | Hodge | Aug. 10, 1937 |
| 2,348,116 | Dzus | May 2, 1944 |
| 2,433,339 | Brown | Dec. 30, 1947 |
| 2,603,879 | Coutu | July 22, 1952 |
| 2,666,266 | Sinhel | Jan. 19, 1954 |